United States Patent
Wang et al.

(10) Patent No.: US 6,711,418 B1
(45) Date of Patent: Mar. 23, 2004

(54) WIRELESS PERSONAL MOBILE DATA TERMINAL RECEIVING A WIDE-AREA BROADCAST AND CAPABLE OF TWO-WAY COMMUNICATION IN A LOCAL AREA

(75) Inventors: Weijia Wang, Sunnyvale, CA (US); Nhan Tri Nguyen, San Jose, CA (US)

(73) Assignee: General Wireless Communications Inc., Santa Clara, CA (US)

( * ) Notice: Subject to any disclaimer, the term of this patent is extended or adjusted under 35 U.S.C. 154(b) by 1446 days.

(21) Appl. No.: 08/543,101

(22) Filed: Oct. 13, 1995

(51) Int. Cl.[7] .................................................. H04Q 7/00
(52) U.S. Cl. .............................. 455/553.1; 455/556.1; 455/466
(58) Field of Search ............................ 455/33.1, 38.1, 455/56.1, 62, 89, 90, 73, 552.1, 553.1, 556.1, 557, 466; 379/57, 59

(56) References Cited

U.S. PATENT DOCUMENTS

| | | | | |
|---|---|---|---|---|
| 5,148,473 A | * | 9/1992 | Freeland et al. | 379/57 |
| 5,153,903 A | * | 10/1992 | Eastmond et al. | 379/57 |
| 5,175,758 A | * | 12/1992 | Levento et al. | 379/57 |
| 5,508,709 A | * | 4/1996 | Krenz et al. | 455/90 |
| 5,526,401 A | * | 6/1996 | Roach, Jr. et al. | 455/33.1 |
| 5,553,317 A | * | 9/1996 | Hara | 37/347 |

* cited by examiner

*Primary Examiner*—Lester G. Kincaid
(74) *Attorney, Agent, or Firm*—Edward C. Kwok; MacPherson Kwok Chen & Heid LLP

(57) ABSTRACT

A wireless personal mobile terminal in a cellular data network includes a packet radio transceiver for communicating with cellular base stations and a paging receiver for receiving paging signals from a paging transmitter serving a large geographical area. The wireless personal mobile message unit has power-saving features built into the signal format. This personal mobile message unit accommodates many communication applications due to the high bandwidth and the low latency achieved in the cellular data network. Low-power operation and wide coverage is achieved using existing one-way paging infrastructure. The wireless personal mobile unit can be achieved inexpensively by modifying a conventional one-way pager.

20 Claims, 9 Drawing Sheets

LOCAL ANTENNA

WIRELESS PERSONAL MOBILE DATA TERMINAL RECEIVING A WIDE-AREA BROADCAST AND CAPABLE OF TWO-WAY COMMUNICATION IN A LOCAL AREA

CROSS REFERENCE TO RELATED APPLICATIONS

The present application relates to (i) copending patent application, Ser. No. 08/542,860, filed on the same date as this application, entitled "Two-Way Wireless Data Network," by Weijia Wang, also assigned to General Wireless Communication Corporation, and (ii) copending patent application, Ser. No. 08/542,770, filed on the same date as this application, entitled "Wireless Network Access Protocol," by Weijia Wang et al, also assigned to General Wireless Communication. These applications are hereby incorporated by reference in their entireties to provide technological background of the present invention.

BACKGROUND OF THE INVENTION

1. Field of the Invention

The present invention relates to wireless communication, and in particular, relates to wireless communication in a data network having a large number of mobile terminal units communicating with each other through one or more cellularized base stations, which are connected by wired or wireless links to form a back-haul data network.

2. Discussion of the Related Art

One-way messaging or paging application is a well-established economical technology for transmitting short messages to a mobile pager. In one-way paging, typically, a caller calls a paging station using a telephone number assigned to the pager for which the message is intended. The message is then provided to the service computer at the paging station which, in turn, broadcasts the message, using high power transmitters, in its service area. In the broadcast message, the user's message is packaged in a data frame which contains an address code which identifies the recipient pager. The recipient pager is then activated by the receipt of the message, causing a vibration or an audible signal, thereby informing the callee the arrival of the message. Other applications have also been developed for one-way paging. For example, the service computer may broadcast to subscribing users stock quotes, weather information, results of sports events, and other information of interests.

However, one-way paging is limited in that the callee must respond to the caller through an alternative network. Typically, the alternative network is the telephone network. However, because users of paging systems are by nature mobile, to respond to a page through the telephone network requires easy access to the telephone network. Access to the telephone network is sometimes inconvenient. This inconvenience can be eliminated if a two-way communication capability is provided to the pager.

Other applications using one-way messaging technology have also been developed. Some of these applications relate to dissemination of information, such as weather reports, stock quotes, news headlines, or results of sports events. However, because communication is one-way in these applications, the amount or type of information that can be disseminated in this manner is constrained by the recipient's inability to select in real time information he or she desires. A two-way communication capability can provide "information-on-demand" services which are more suitable to individual user needs, as well as providing a more efficient use of the broadcast spectrum.

Two-way communication services are, however, expensive because of complexity. For example, in a cellular digital packet data (CDPD) system, a large number of cellularized base stations are distributed all over the service area. Cellularizing the service area offers two advantages: (i) allow mobile units and base stations to transmit at higher data rate with relatively low power, since the expected distance between a mobile unit and a base station in the vicinity is short; and (ii) larger capacity is provided because base stations which are separated by large enough distances can use the same radio channels. Such a system provides thus very high capacity, low response delay and allows the mobile units to transmit at relatively high data rates. In such a system, two-way symmetrical and reliable data links can also be provided.

In a CDPD system, because connectivity is maintained over the entire duration of a data communication session, multiple channels must be provided to allow multiple sessions to be maintained simultaneously. To locate a recipient mobile unit of a message, the network broadcasts the address of the recipient mobile unit from all the base stations in the service area until the recipient unit responds. Thus, a large amount of network resources is dedicated to locating mobile units. Further, to maintain continuous connectivity and to allow real time performance, when the session is established, the CDPD unit is associated with a base station with which it communicates. In addition, because a mobile unit can be expected to be used in a moving vehicle, it is possible that the mobile unit moves out of the service range of the initially associated base station and moves into the service range or ranges of one or more such base stations during the duration of a session. Thus, provisions must be made to disengage an associated base station and to engage an additional base station or stations ("hand off") during the course of the session. The control mechanisms for maintaining a CDPD session, including tasks typically termed "connectivity management" and "mobility management", involve sophisticated algorithms which require high performance computers to handle setting up the session, maintaining the session, and tracking the communicating mobile units as they move between service areas of the cellularized base stations. The complexity of the system requires a large investment in expensive equipment. Often, these control mechanisms are centralized, i.e. a large network switching or control center is provided to handle the mobile units in a given service area, so that, at times of heavy data traffic, the network control center may become a bottle neck, introducing undesirable latency into the system.

Another major disadvantage of the CDPD system is the requirement that the receiver of the mobile unit must be on at all times to receive messages. As a result, such a mobile unit requires a battery that is, at the present time, too undesirably bulky for mobile use. It would also be extremely difficult for power-saving features to be provided in such a mobile unit. Unlike a pager, which monitors only one paging channel, the mobile unit of a CDPD system must monitor a different radio channel when it is located in a different cell. Further, control information (e.g. timing information and recipient addresses) are broadcast by base stations in dedicated control channels. While a pager can be assigned a periodically occurring time-slot during which it "wakes" up to check for messages, a similar scheme in a mobile unit of a CDPD system would require timing in all the cellular base stations to be synchronized. Failure to synchronize all base station can lead to a mobile unit checking for the broadcast of its address during the wrong time slot.

Thus, a data network which allows bidirectional communication between mobile units without sophisticated equipment to perform connectivity and mobility management tasks is highly desirable.

SUMMARY OF THE INVENTION

The present invention provides for a two-way personal mobile terminal having a first receiver to receive broadcast messages from a high-power transmitter and a transceiver to transmit and receive control and data signals between it and a local cellularized base station. In one embodiment, the high-power transmitter is a broadcast transmitter compatible with one-way paging systems. In fact, in that embodiment, the high-power transmitter broadcasts a data message intended for a two-way personal mobile terminal, as if the data message is intended for a one-way pager. In that embodiment, the personal mobile terminal receives its message through its first receiver. The receiver demodulates the broadcast signal, and passes the demodulated signal to an on-board microprocessor to be decoded and displayed on a display of the personal mobile terminal, just like a one-way pager. However, under the present invention, the user of the personal mobile terminal may respond by transmitting a reply message using the personal mobile terminal's transceiver. This reply message is received by a cellularized local base station, which then relays the message to the network control center for further handling.

Thus, the present invention provides two-way communication capability by leveraging the existing infrastructure of one-way paging. For example, expensive resources such as high-power paging transmitters can be used for both one-way and two-way applications. Further, the personal mobile terminal can be the basis for a data network, which can be built by providing relatively inexpensive (i.e. relative to high cost high-power transmitters) cellularized base stations. The existing one-way paging user-base can converted to become users of this data network by simply purchasing such a personal mobile terminal. This data network provides additional applications beyond mere two-way paging.

Because the personal mobile terminal is receive-only with respect to messages from one-way paging towers, and transmits messages only to the cellularized base stations within a very limited range of its immediate vicinity, the power consumption for such personal mobile terminal is small. Thus, the personal mobile terminal can be made as compact as a one-way pager.

The present invention is more fully understood after consideration of the following written description and accompanying drawings.

BRIEF DESCRIPTION OF THE DRAWINGS

FIG. 3b is a block diagram of CPU board 600 shown in FIG. 3a.

DETAILED DESCRIPTION OF THE PREFERRED EMBODIMENTS

Figure 1:
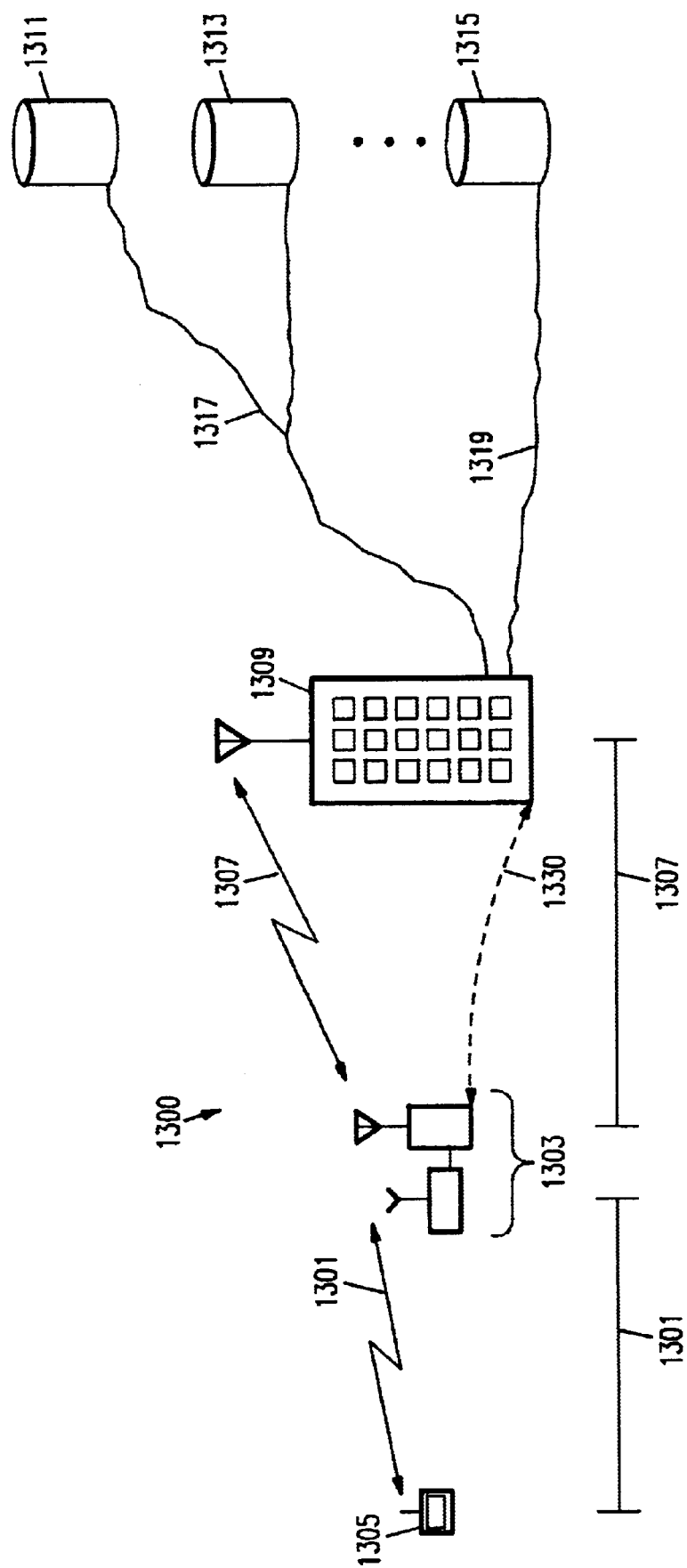
FIG. 1 shows a wireless data network 1300 in which the personal mobile terminal of the present invention can be deployed.

FIG. 1 shows an architecture of a two-way wireless data network 1300, in accordance with the invention. Two-way wireless data network 1300 includes (a) personal mobile terminal 1305; (b) cellularized base station 1303; (c) message switching center 1309; (d) interfaces 1311–1315 to information and communication applications; and (e) radio links 1301 and 1307.

Base station 1303 is capable of two-way communication with both personal mobile terminal 1305 and network switching or control center 1309. Consequently, personal mobile terminal 1305 can send a message to base station 1303 and receive an acknowledgement from base station 1303 over a radio link 1301. Radio link 1301 can be a packet radio link. Base station 1303 can then relay the message from personal mobile terminal 1303 to network control center 1309. Upon receiving the message from base station 1303, network control center 1309 can send the message to the intended recipient using a conventional one-way paging infrastructure. If desire, network control center 1309 can also broadcast an acknowledgement packet to confirm to personal mobile terminal 1305 receipt of the message by network control center 1309.

Network control center 1309 is in turn connected to various interfaces 1311–1315 to information and communication applications, which include: (a) existing one-way communications networks, including such wired networks as the telephone network or the internet; (b) information dissemination networks or data banks; (c) security or utility monitoring systems; (d) electronic map or positioning systems; or (e) any one of numerous other possible applications.

Personal mobile terminal 1305 is typically a hand-held unit with a set of keys for data and command input and a display for displaying control and data information. Personal mobile terminal 1305, in addition to being a data terminal, can also be used as a receiving terminal for facsimile transmissions, when equipped with suitable amount of memory and communication bandwidth (e.g. 2400 bps or better)

Referring back to FIG. 1, radio links between a base station and a personal mobile terminal unit, such as radio link 1301, are typically low-power local packet radio links. In this embodiment of the invention, local radio link 1301 can operate with a 100 milli-watt radiated power to provide an expected service range of approximately 3 km. A single base station 1303 and personal mobile terminal 1305 are shown in FIG. 1. However, base station,1303 and personal mobile terminal 1305 are only representative of a plurality of base stations and personal mobile terminals which can be part of two-way wireless data network 1300. In particular, a heavily populated metropolitan area served by two-way wireless data network 300 will have thousands of personal mobile terminals that are like terminals 1305, tens or even hundreds of cellularized base stations that are similar to base station 1303, and one or more network control center that is like network control center 1309. Indeed, one advantage of the method of the present invention is that the size of two-way wireless data network 1300 is scalable to the operating environment, i.e., as more and more customers utilize two-way wireless data network 1300, more base stations 1303 and network control centers 1309 can be added to accommodate the new traffic.

Figure 2:
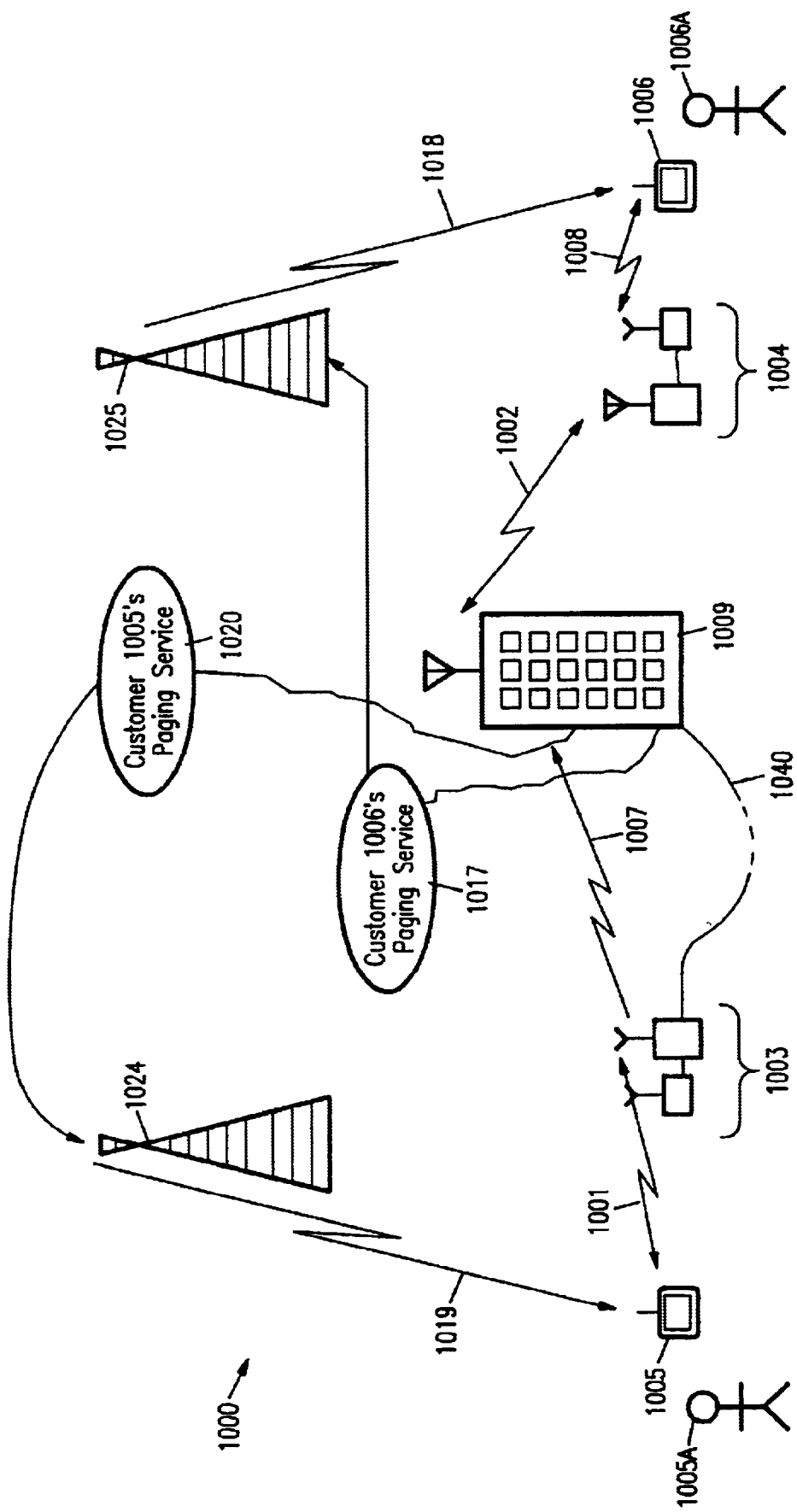
FIG. 2 shows a personal mobile terminal application in wireless data network 1300 of FIG. 1, in which the personal mobile terminal of the present invention is used.

FIG. 2 shows one example of a two-way paging system 1000 according to the invention. As shown in FIG. 2, two-way paging system 1000 includes (i) personal mobile terminals 1005 and 1006, which can each be a personal mobile terminal, in accordance with the present invention; (ii) base stations 1003 and 1004; (iii) network control center 1009; and (iv) high power transmitters 1021 and 1025, which can be part of one or more existing one-way paging systems.

Personal mobile terminals 1005 and 1006 are operated by subscribers designated by reference numerals 1005A and 1006A, respectively. When subscriber 1005A wishes to send a message to subscriber 1006A, subscriber 1005A enters subscriber 1006A's identification and a message into personal mobile terminal 1005 using the alpha-numeric keys thereon, and initiates sending the message to a nearby base stations 1003. Unlike messages in one-way communication networks, where return routing is not provided, this message also contains a paging identification identifying the sender, which is personal mobile terminal 1005.

In the example shown in FIG. 2, the message from personal mobile terminal 1005 is received by base station 1003 via local packet radio link 1001. As with local radio link 1301 described above (FIG. 1), packet radio link 1001 is a two-way packet radio link which allows personal mobile terminal 1005 to both transmit messages to, and receive messages from, base station 1003. In response, base station 1003 transmits an "acknowledgement" packet on packet radio link 1001 to inform subscriber 1005A that his transmission was successful. Base station 1003 transmits the message received from personal mobile terminal 1005 to network control center 1009 via radio link 1007. Base stations 1003 and 1004 are similar to base station 1303 (FIG. 1). Radio link 1007 is also two-way radio link, so that messages are exchanged between base station 1003 and network control center 1009. Link 1007 need not be accomplished by wireless communication. In fact, where a telephone network is accessible, a wire communication link is possible. Such wire communication is indicated in FIG. 10 as telephone line 1040.

At network control center 1009, the message from base station 1003 (and personal mobile terminal 1005) is processed for authorization and billing purposes based on its service agreement with subscriber 1005A. When such administrative tasks are completed, network control center 1009 transmits the received message from personal mobile terminal 1005 to subscriber 1006A's paging service 1017. The sending of this message from network control center 1009 to subscriber 1006A can be accomplished in the same manner as the way messages are sent in one-way paging systems. Thus, when the message is received by paging service 1017, the message is sent to transmitter 1025 (which is operated by subscriber 1006A's paging service 1017) and transmitted to personal mobile terminal 1006. Alternatively, network control center 1009 may keep subscriber 1005A's message form personal mobile terminal 1005 and sends, instead, a notification message to subscriber 1006A through the one-way paging system. Upon receiving this notification message, subscriber 1006A may request for subscriber 1005A's message by sending a message through a base station in his vicinity to network control center. By inspecting the identity of the base station from which subscriber's 1006A is routed, network control center 1009 locates subscriber 1006A, and subscriber 1005's message can be routed to subscriber 1006A through that base station. Using this alternative approach, subscriber 1005A's message is not broadcast within the range of the entire service area, but only within the immediate vicinity of subscriber 1006A, thus the same frequency channel can be used in other cells simultaneously, thereby increasing enormously the total bandwidth of the system.

Subscriber 1006A can send an immediate reply using subscriber 1005A's paging identification in the message received. The reply message can be composed in the same manner discussed above with respect to subscriber 1005A's message, or it can be simply an automatically generated acknowledgement message dispatched by a special command to the user interface. The reply message or acknowledgement message is then transmitted from personal mobile terminal 1006 to a second base station 1004 via two-way radio link 1008. The reply message finds it way to subscriber 1005A in substantially the same way subscriber 1005A's message reaches subscriber 1006A. In this instance, the message is sent through base station 1004, network control center 1009, paging service 1020, and transmitter 1021. In this example, paging services 1017 and 1020 can be operated by the same company or they can be entirely separate, and even competing, paging services. Of course, the reply message can also be sent through two-way communication over a base station, using the notification mechanism described above.

Figure 3A:
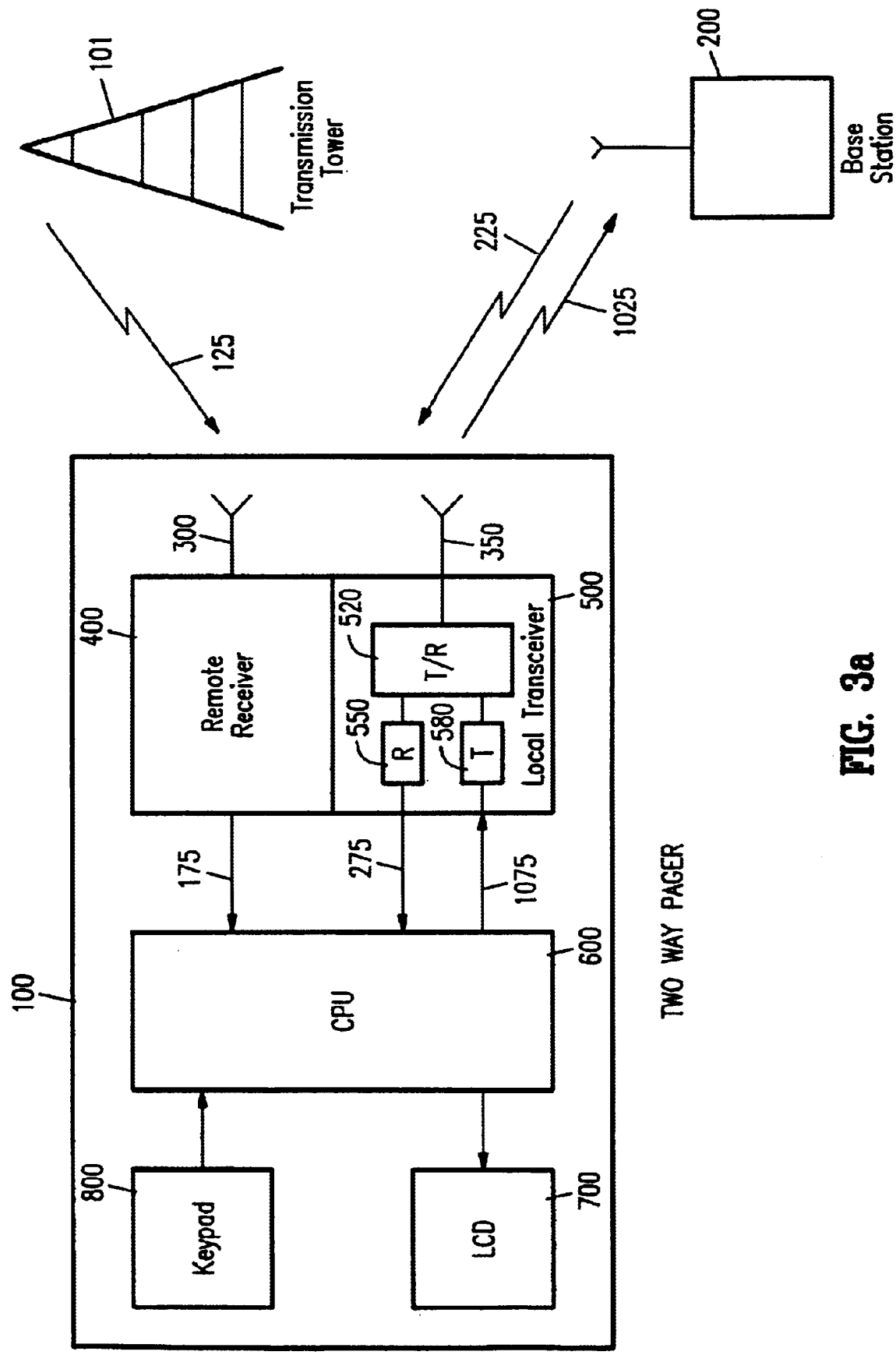
FIG. 3a is a block diagram of a personal mobile terminal 100 in accordance with the invention.

FIG. 3a shows personal mobile terminal 100 in accordance with the invention. A transmission tower 101, which may be a high-power broadcast transmitter compatible with a one-way paging system, broadcasts a data signal 125 on an assigned carrier frequency. Data signal 125 includes a conventional paging message 175 (not shown). In this embodiment, personal mobile terminal 100 has a "receive-only" link with transmission tower 101. Personal mobile terminal is equipped with conventional antenna 300 to receive data signal 125 and a receiver 400 to extract message data 175.

Figure 4A:
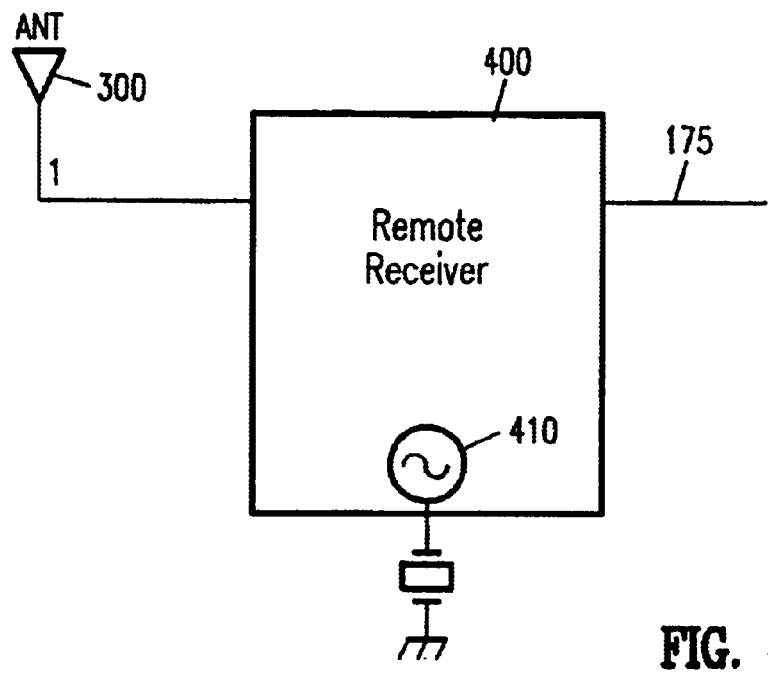
FIG. 4a shows receiver circuit 400 incorporating an internal frequency oscillator 410 (shown in FIG. 4a) to demodulates incoming data signal 125.
Figure 4B:
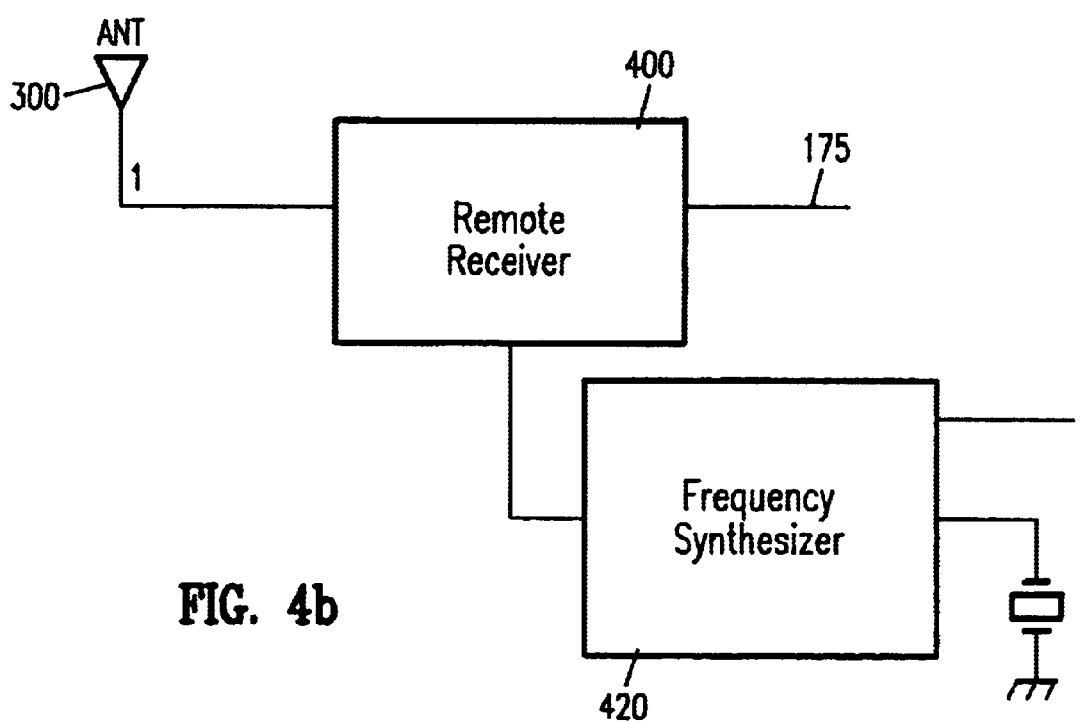
FIG. 4b shows receiver circuit 400 incorporating a programmable frequency synthesizer 420 to demodulate incoming data signal 125.

Antenna 300 is tuned to receive signals over a preselected range of carrier frequency. Antenna 300 consists of a single loop antenna removably mounted inside personal mobile terminal 100's housing on a printed circuit board, which is shared with receiver circuit 400. Receiver circuit 400 can be any conventional receiver circuit used in a one-way paging network. Receiver circuit 400 demodulates data signal 125 to provide the baseband data message 175. In the present embodiment, receiver circuit 400 is a direct downconversion frequency shift-keyed (FSK) receiver, such as provided by the UAA2080 pager receiver integrated circuit available from Philips Microelectronics Inc. Data message 175 is then provided to personal mobile terminal 100's on-board microprocessor, which resides on central processing unit (CPU) board 600. Data message 175 can then be stored, further processed, or displayed on an on-board liquid crystal display (LCD) 700. Alternatively, receiver circuit 400 can also incorporate an internal frequency oscillator 410 (shown in FIG. 4a) or a programmable frequency synthesizer 420 (shown in FIG. 4b) to directly downconvert data signal 125. The extensive frequency range in which the frequency synthesizer operates allows the personal mobile terminal to operate over a wide range of carrier frequencies. The wide operating range is useful, since personal mobile terminal 100 is then operable, with minimal or no conversion, in a large number of locales where the assigned paging frequencies are different. Of course, receiver circuit 400 can include single or multiple stage superheterodyne circuits, and may operate under any keying schemes, such as PSK (phase shift-keying) or ASK (amplitude shift-keying) demodulation schemes, for extracting baseband message 175 from data signal 125.

Figure 3B:
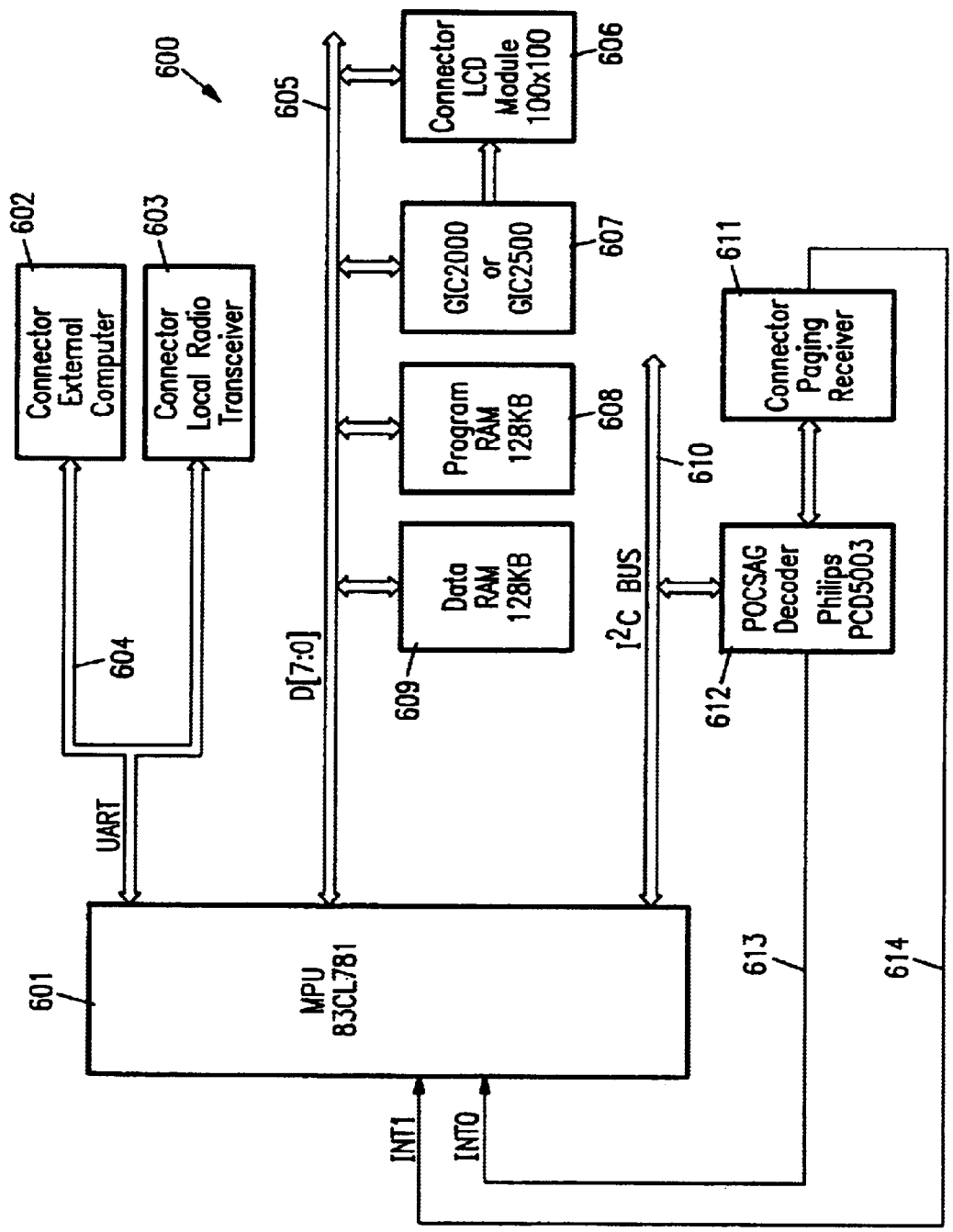

A block diagram of CPU board 600 is provided in FIG. 3b. As shown in FIG. 3b, a microprocessor 601 is provided on CPU board 600 to control the operations of personal mobile terminal 100. Microprocessor 601 can be implemented by the 8-bit microprocessor 83CL781. Receiver circuit 400 is coupled into CPU board 600 by a connector 611 to a data signal decoder 612, which can be implemented a POCSAG decoder PCD5003, available from Philips N.V. When a data signal (i.e. message 175) is received at receiver circuit 400, signal decoder 612 asserts an interrupt at microprocessor 601 on interrupt line 613. Data in message 175 are presented to microprocessor 601 on an industry standard I²C bus 610. In the present embodiment, a connector 602 is provided to allow access to personal mobile terminal 100 by an external host computer. Connector 602 is coupled to microprocessor 601 over a serial link implemented by a universal asynchronous receiver/transmitter (UART) 604. UART 604 also couples local transceiver 500 via connector 603 to microprocessor 601.

Microprocessor 601 communicates with data memory 609 and program memory 608 over an 8-bit industry standard bus 605. In this embodiment, data and programming memories are each provided to have 128 K-bytes. In addition, an application specific integrated circuit (ASIC) 607 provides a 220 K-byte font library for storing character fonts to be displayed on LCD display 700 and glue logic functions, such as a keypad control circuit, a display control circuit 606, address decoding for 8-bit bus 605, and interrupt registers. ASIC 605 can be implemented by a field-programmable gate array.

Referring to FIG. 3a, personal mobile terminal 100 can also be used to establish a second communication link with a local base station 200. The use of this link is discussed extensively in copending patent application "Two-way Wireless Data Network" incorporated by reference above. This second link is a half-duplexed two-way link between personal mobile terminal 100 and a cellularized local base station 200, in which personal mobile terminal 100 and local base station 200 communicates using the same frequency. Using the same frequency to transmit and receive, the present invention allows for personal mobile terminal 100 and base station 200 to have a relatively simpler design. The network access protocol for communicating over this two-way link is discussed in the copending patent application "Wireless Network Access Protocol" incorporated by reference above. Because this two-way link is local, i.e. the limited range of the base station, transmission power required of personal mobile terminal 100 is low. Further, because of the limited range for this communication, the same frequency can be used simultaneously at different portions of the data network without the complication of collision. Thus, system bandwidth is dramatically increased.

Figure 5:
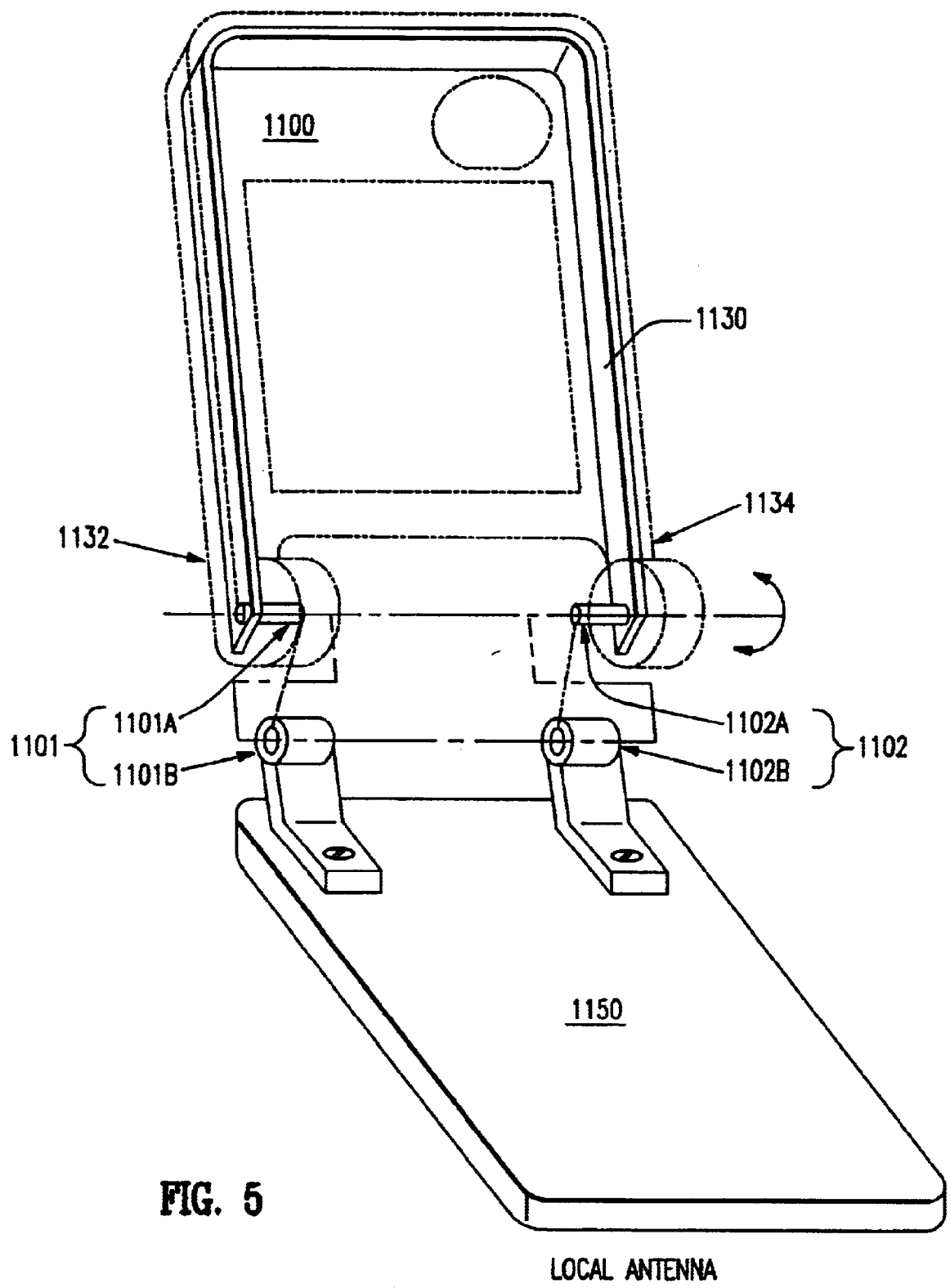
FIG. 5 shows local antenna 350 (i.e. the antenna used for communication with a local cellularized base station) in the embodiment of personal mobile terminal 100 shown in FIG. 3.

In this embodiment, personal mobile terminal 100 establishes a two-way local link with base station 200 using a second antenna 350 and local transceiver 500. Local antenna 350 may be any conventional antenna which can transmit or receive signals at the preassigned two-way carrier frequency between personal mobile terminal 100 and the base station 200. However, because of the expected range of frequencies over which local radio link 301 operates (i.e. between 150 MHz to 1 GHz), antenna 350 may be required to have a dimension in the order of one meter. An antenna which is extended linearly to such length is both aesthetically unpleasant and inconvenient in an urban environment. Thus, the present invention provides a loop antenna conveniently enclosed in personal mobile terminal 100. FIG. 5 shows local antenna 350, which is a loop antenna 1130 molded into personal mobile terminal 100's cover 1100. In this embodiment, the housing is designed such that, for receiving functions, cover 1100 conceals and protects the portion of keypad 800 which is used for transmission functions. Cover 1100 also protects personal mobile terminal 100's LCD display 700, allowing LCD display 700 to be visible through a window in cover 1100. However, to transmit, the user lifts cover 1100 to access the transmit function keys, thereby placing the loop antenna 1130 in position for transmission. Loop antenna 1130 is made from an electrically conductive, preferably metallic, material and is concealed in cover 1100 for aesthetic reasons. As shown in FIG. 5, ends 1132 and 1134 of loop antenna 1130 are mechanically and electrically coupled by conductive hinge pins 1101a and 1102a, respectively, to conductive hinge assemblies 1101b and 1102b.

Conductive hinge assemblies 1101b and 1102b are mechanically attached to the remainder of personal mobile terminal 100's housing, and electrically coupled to the printed circuit board on which local transceiver 500 resides. Hinge pins 1101a and 1102a and hinge assemblies 1101b and 1102b form hinges 1101 and 1102 to allow cover 1100 to conceal and expose, when desire, keypad 800 and LCD display 700.

Referring back to FIG. 3a, local transceiver 500 can be any conventional transceiver having a carrier signal port for transmitting a data signal 1025 and receiving a base station signal 225 at the preassigned two-way carrier frequency. In addition, local transceiver 500 receives message 1075 from CPU board 600, which is modulated for transmission as signal 1075 in local transceiver 500. Messages from base station 200 to personal mobile terminal 100, such as acknowledgement messages, are sent from base station 200 as signal 225. Signal 225 is picked up by antenna 350 and demodulated by local transceiver 500 to extract embedded message 275, which is then provided to CPU board 600.

Figure 6A:
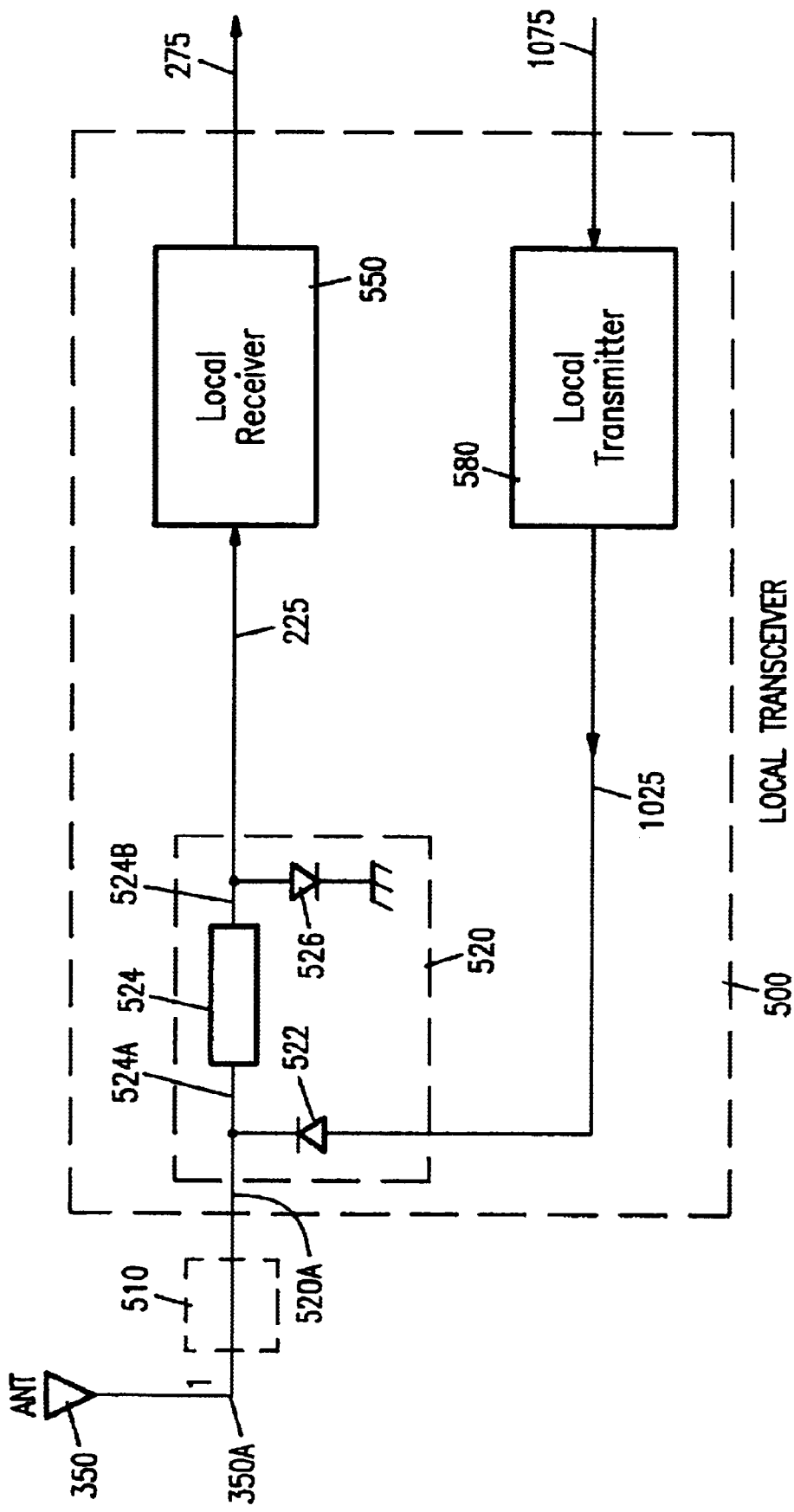
FIG. 6a shows one embodiment of transceiver 500, which includes a transmit-receive switch circuit 520, a local receiver 550 and a local transmitter 580.

FIG. 6a shows one embodiment of local transceiver 500, which includes a transmit-receive switch circuit 520, a local receiver 550 and a local transmitter 580. Transmit-receive switch circuit 520 serves to isolate transmitter 580 from receiver 550 during local transceiver 500's transmit and receive states. Receiver 550 is implemented to extract the base station message data 275 from the received base station signal 225. Transmitter 580 superimposes message data 1075 onto the preassigned two-way paging carrier frequency and transmits the data signal 1025.

Transmit-receive switch circuit 520 shown in FIG. 6a is coupled between antenna 350, transmitter 580 and receiver 550. Transmit-receive switch circuit 520 can be provided by an antenna switch, such as the Motorola MRFIC2003, available from Motorola, Inc., or a circulator. Alternatively, as shown in FIG. 6a, transmit-receive switch circuit 520 is provided by PIN diodes 522 and 526, with the cathode terminal of PIN diode 522 and the anode terminal of PIN diode 526 coupled to terminals of a quarter-wave circuit 524. The transmission path of the quarter-wave circuit 524 is approximately one-quarter of the wavelength of preassigned two-way data signal 1025. PIN diodes 522 and 526 have relatively high "turn-on" voltages (e.g. 0.3V–0.7V) and do not become forward-biased when exposed to small signal levels such as those received from local base station 200 or high-power transmitter 100.

The operations of PIN diodes 522 and 526 in transmit-receive switch circuit 520 are discussed next. Signal 225 received from local base station 200 at local antenna 350 is a low intensity data signal. Since signal 225 does not have an amplitude sufficient to turn on PIN diode 522, data signal 225 is blocked from transmitter 580. Hence, data signal 225 is coupled to the input terminal of the local receiver 550 with minimal loss. Minimal signal loss allows the local base station signal to retain a high carrier-to-noise ratio (C/N), which is required for receiver 550 to achieve a low bit error rate (BER). PIN diode 526 does not couple data signal 225 to ground because the amplitude of signal 225 received is typically insufficient to forward-bias PIN diode 526 to a conducting state.

During the transmission operation of transmitter 580, data signal 1025 forward-biases PIN diode 522, so that data signal 1025 can split at the cathode terminal of PIN diode 522 between antenna 350 and receiver 550. However, PIN diode 526 is forward-biased by the amplitude of data signal 1025 (approximately +3 to +30 dBm). With PIN diode 526 forward-based, loss of power and possible damage to receiver 550 are avoided. To avoid significant power loss via PIN diode 526 to ground, quarter-wave circuit 524 transforms the substantially low impedance at the terminal 524b to a substantially high impedance at input terminal 524a. The high impedance path at input terminal 524a effectively channels the power in data signal 1025 towards antenna 350, where it is transmitted.

An antenna network 510 can be added to further enhance operation of transmit-receive switch circuit 520. Antenna network 510 can include an impedance matching circuit coupled between local antenna 350 and transmit-receive switch circuit 520. Such an impedance matching circuit increases both signal reception, during a receive state, and transmission efficiency, during a transmit state, by matching the output impedance of the local antenna 350a to substantially the impedance present at the input terminal 520a of the transmit-receive switch circuit 520. An input filter can also be provided in addition to, or in lieu of the impedance matching circuit, so as to reduce external interference during receiving, or to restrict signal transmission to a specified band, during transmitting.

Figure 6B:
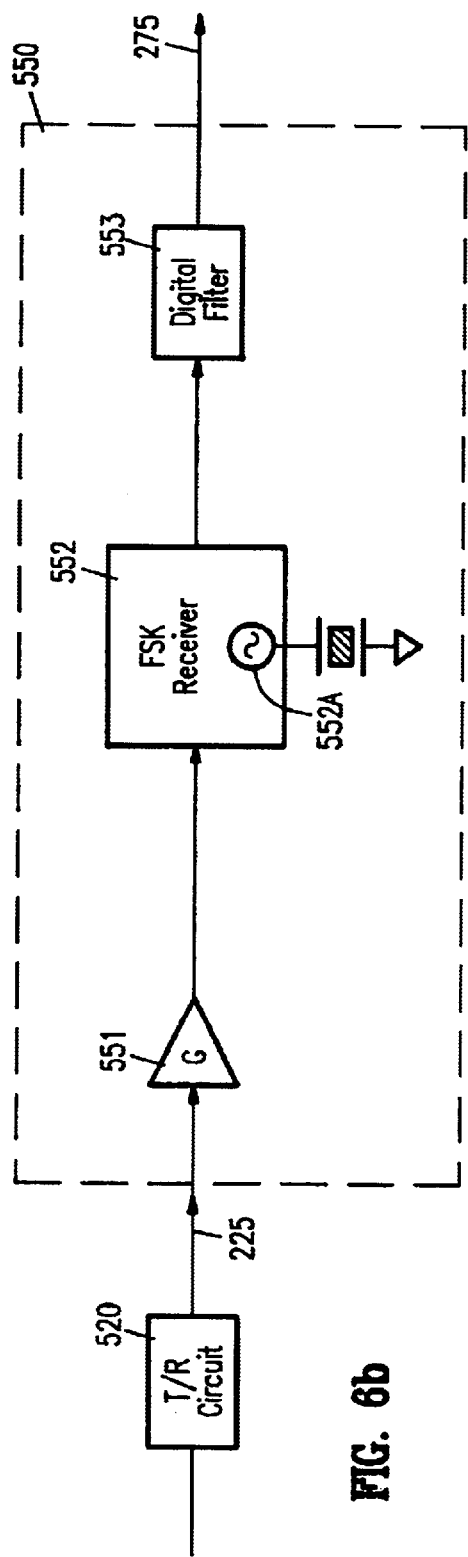
FIG. 6b shows an implementation of receiver 500 of the present invention.
Figure 6C:
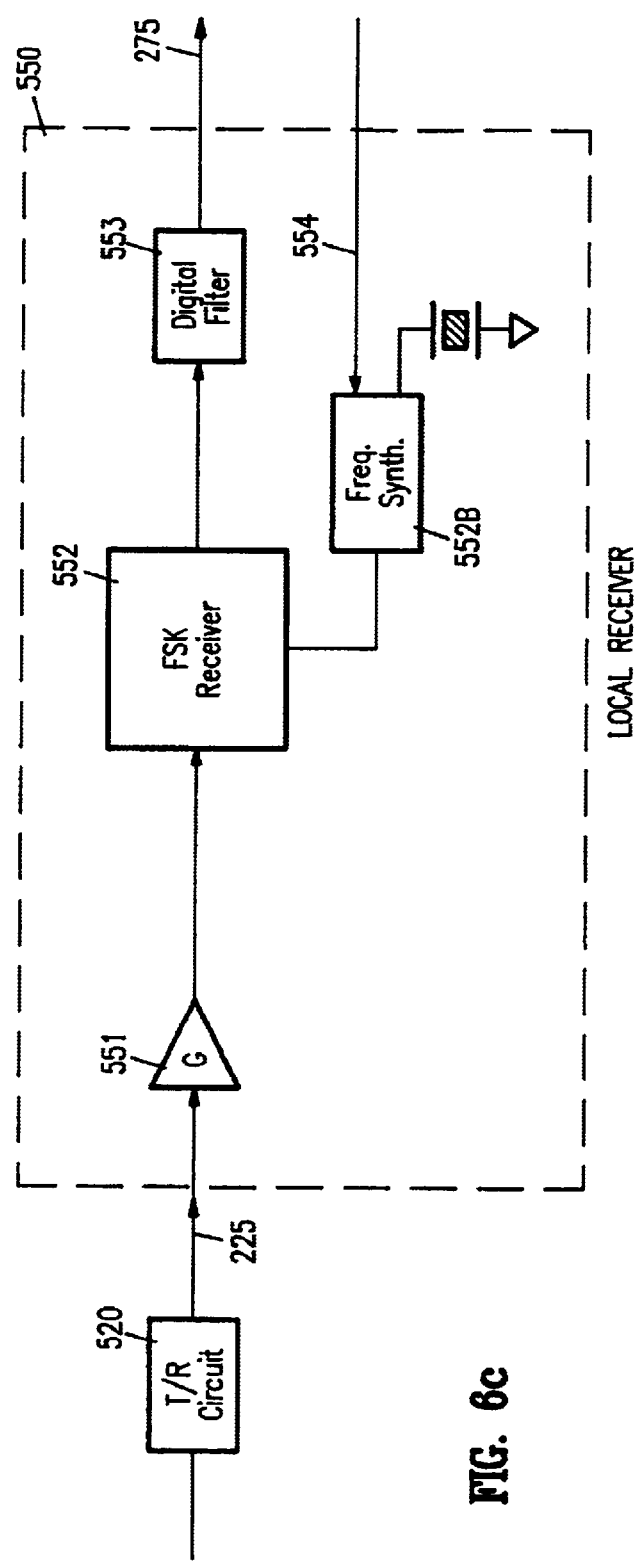
FIG. 6c shows a second implementation of receiver 500 of the present invention, in which a frequency synthesizer circuit 552b is provided.

FIGS. 6b and 6c show alternative implementations of receiver 500 of the present invention. As shown in FIG. 6b, receiver 550 includes an input amplifier 551, a frequency shift-key (FSK) receiver 552 and a digital filter 553. Input amplifier 551 typically has a high signal gain and a low noise figure to suppress the input noise figure of receiver 550 to a minimum value. Thus amplified, signal 225 is fed into a FSK receiver 552, which can be provided by a UAA2080 direct-conversion FSK receiver integrated circuit disclosed above. Using the UAA2080, the FSK receiver 552 may utilize an internal frequency oscillator 552a to tune to the assigned two-way carrier frequency and to directly downconvert the signal from base station 200. Alternatively, as shown in FIG. 6c, programmable frequency synthesizer 552b can be used in lieu of internal frequency oscillator 552a. Frequency synthesizer 552b has a higher frequency selectivity than internal oscillator 552a. Digital filter 553 receives the demodulated output signal of FSK receiver 552 and produces baseband message data 275. Message 275 is then provided to CPU board 600 where it may be stored or displayed on a display terminal such as an LCD display 700.

Figure 6D:
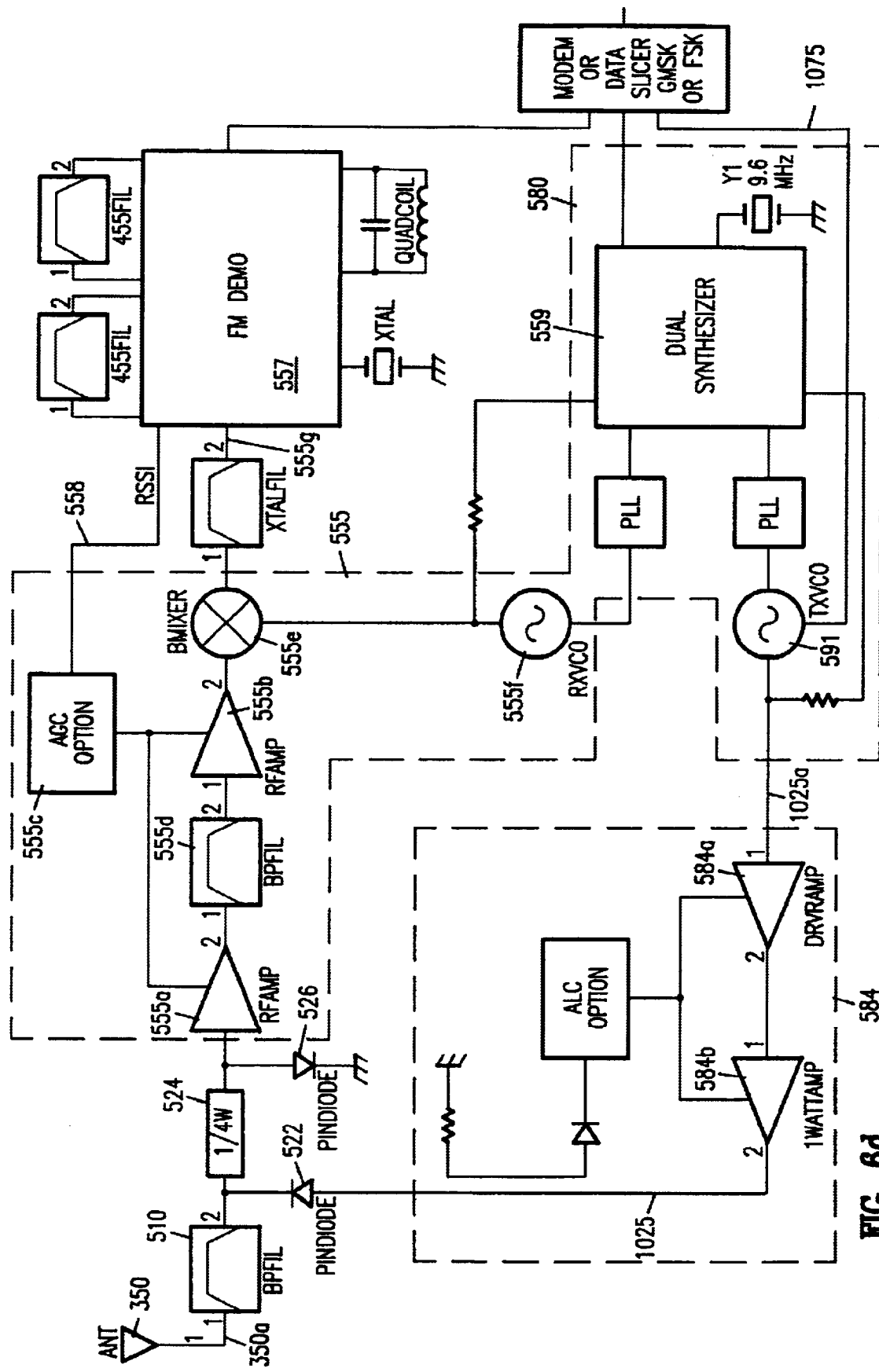

FIG. 6d illustrates another implementation of receiver 550, using a downconverting circuit 555 and a Gaussian Minimum Shift Keying (GMSK) receiver 557. The downconverting circuit 555 includes a first-stage amplifier 555a for setting input noise figure, and a second-stage amplifier 555b for increasing signal strength. A bandpass filter 555d may be used between first- and second-stage amplifiers 555a and 555b. Amplifiers 555a and 555b are both coupled to an automatic gain control (AGC) circuit 555c which monitors and increases the gain of one or both of amplifiers 555a and 555b, when the received strength of the local base station signal 225 is low, and decrease their gains when the received signal strength is high. AGC circuit 555C outputs a received signal strength indicator (RSSI) signal 558 to the GMSK receiver 557. Down-converter circuit 555 further includes a mixer 555e and a local oscillator 555f for down-converting data signal 225 into an intermediate frequency (IF) signal 555g. As shown in FIG. 6d, local oscillator 555f includes a voltage controlled oscillator (VCO) coupled to a dual-frequency synthesizer 559 in a phase locked loop configuration.

The GMSK receiver 557 receives IF signal 555g to extract message 275. GMSK receiver 557 performs the same function as FSK receiver 552 but requires only half the frequency deviation of a standard FSK scheme to detect orthogonal signals. Thus, within a specified frequency deviation bandwidth, as compared to FSK receiver 552, the GMSK receiver 557 can process twice as much data. Message 275 is fed into a CPU board 600 where it may be stored, further processed, or displayed on a display terminal such as an LCD 700.

Local transmitter 580 is coupled to the transmit-receive switch circuit 520 and generates the data signal 1025 by superimposing message data 1075 onto the local carrier frequency. Local transmitter 580 may be any conventional transmitter having a data input for receiving message data 1075 and a second carrier output for providing a data signal 1025 at the local carrier frequency. One choice of a local transmitter is an FSK modulator. Such an FSK modulator can use the internal oscillator and frequency multiplier circuits of an FSK receiver, as can be used to implement local receiver 550. Alternatively, as shown in FIG. 6d, modulator 580 can be a programmable frequency synthesizer 559, which shares a phase-locked loop with down-converter 555. In this embodiment, the frequency synthesizer 559 generates the local carrier signal at VCO 591, which is used to modulate message 1075 to provide modulated signal 1025a.

Output amplifier 584 amplifies the modulated signal 1025a for transmission to the base station 200. As shown in FIG. 6d, output amplifier 584 includes a two-stage amplifier circuit. In the first stage, driver amplifier 584a provides a high gain for signal 1025a. Second stage amplifier 584b amplifies signal 1025a to provide data signal 1025 at a high output power. Of course, output amplifier circuit 584 may include two or more amplifiers in succession depending upon the gain requirements and desired transmission power of the data signal.

Since personal mobile terminal 100 is powered by a battery-based power source, as the remaining battery charge decreases over time and use, output amplifier 584 may produce data signal 1025 at varying output levels. Power variation in data signal 1025 may result in a low power signal at local base station 200, which may prevent local base station 200 from receiving signal 1025 from personal mobile terminal 100 due to the FM capture effect causing base station 200 to lock on to the message of a more powerful near by personal mobile terminal. Thus, as shown in FIG. 6d, an automatic level control circuit 584c is provided to maintain a minimum variation in transmitted output power over a wide range of battery charge conditions.

It should be noted that, although local receiver 550 and remote receiver 400 are shown as separate circuits in FIG. 3 and treated as such in FIGS. 4a–4b and 6a–6d, the present invention can also be provided by an embodiment in which a single receiver is provided. In such a circuit, a tuning circuit can be provided to tune the receiver to either the remote carrier frequency or the local (i.e. 2-way communication) carrier frequency. Such a tuning circuit may, for example, selects between two internal local oscillators which are tuned, respectively, to the remote and local carrier frequencies. Alternatively, a programmable frequency synthesizer can also be used.

The above detailed description is provided to illustrate the specific embodiments of the present invention and is not intended to be limiting. Numerous variations and modifications within the scope of the present invention are possible. The present invention is set forth in the appended claims.

We claim:

1. A personal mobile terminal comprising:
a receiver for receiving a first data signal modulated by a first carrier frequency;
a transceiver for transmitting a second data signal modulated by a second carrier frequency and for receiving a third data signal modulated by said second carrier frequency;
a central processing unit for controlling operations of said personal mobile terminal in accordance with a predetermined protocol, in which said personal mobile terminal receives a notification message at said receiver and, upon receiving said notification messages, initiates two-way data communication using said transceiver.

2. A personal mobile terminal as in claim 1, wherein said receiver is adapted to receive said fist data signal from a transmitter of a paging service.

3. A personal mobile terminal as in claim 1, wherein said transceiver is adapted to transmit said second data signal to a local cellularized base station.

4. A personal mobile terminal as in claim 1, further comprising:
a keyboard;
a display; and
a user interface program running on said central processing unit, said user interface receiving from said keyboard user input for composing messages to be transmitted in said second data signal and displaying on said display messages received in said first data signal.

5. The personal mobile terminal of claim 1, wherein said transceiver further comprises:
an antenna adapted for both transmitting said second data signal and receiving said third data signal; and
a transmit-receive switch circuit coupling said antenna alternatively for receiving said third data signal and transmitting said second data signal.

6. The personal mobile terminal of claim 5, wherein said personal mobile terminal further comprises:
a display;
a keyboard including a key for a user to indicate execution of a transmission command; and
a housing for enclosing said receiver and said transceiver, said housing including a movable member on which said antenna is attached, said movable member having a window and capable of being disposed at a first position and at a second position, such that when said movable member is disposed in said first position, said movable member covering said key and allowing said display to be read through said window, and when said moveable member is in said second position, said key is exposed and said antenna being positioned for transmitting said data signal.

7. The personal mobile terminal of claim 1, wherein said receiver comprises a frequency shift-keying receiver.

8. The personal mobile terminal of claim 1, wherein said receiver comprises a Gaussian minimum shift-keying receiver.

9. The personal mobile terminal of claim 1, further comprising an external frequency synthesizer for providing said first and second carrier frequency to said receiver and said transceiver.

10. The personal mobile terminal of claim 1, wherein said transceiver includes a second receiver comprising:
a downconverting circuit coupled to receive said third data signal;
an input terminal coupled to receive a reference signal of a reference frequency;
an amplifier circuit coupled to receive and amplify said third data signal; and
a mixer for mixing said amplified third data signal with said reference signal to provide an output signal of an intermediate frequency.

11. The personal mobile terminal of claim 10, wherein said amplifier comprises an automatic gain control circuit.

12. The personal mobile terminal of claim 10, further comprising a dual-frequency synthesizer for providing said reference frequency.

13. The personal mobile terminal of claim 12, wherein said dual frequency synthesizer provides said transmitter a signal of said second carrier frequency.

14. The personal mobile terminal of claim 1, wherein said transceiver further comprises an automatic level control circuit for maintaining a signal level of said second data signal.

15. A personal mobile terminal as in claim 1, further comprising a wired data interface for access by an external computer to said personal mobile terminal.

16. A personal mobile terminal comprising:
a first antenna;
a first receiver, coupled to said first antenna, for receiving a first modulated signal of a first carrier frequency;
a second antenna;
a second receiver, coupled to said second antenna, for receiving a second modulated signal of a second carrier frequency;
a transmitter, coupled to said second antenna, for transmitting a third modulated signal of said second carrier frequency; and
a central processing unit for controlling operations of said personal mobile terminal in accordance with a predetermined protocol, in which said personal mobile terminal receives a notification message at said first receiver and, upon receiving said notification messages, initiates two-way data communication using said second receiver and said transmitter.

17. A personal mobile terminal as in claim 16, wherein said personal mobile terminal further comprises:
a keypad for receiving user input data; and
a display for displaying output data;

wherein said central processing unit, in accordance with said user input data, controls the operations of said first and second receivers and for displaying messages decoded from said first and radio signal.

18. A personal mobile terminal as in claim 17, wherein said first receiver demodulates said first modulated signal to achieve a first demodulated signal, said first receiver further comprises a digital filter coupled to said first receiver to process said first demodulated signal.

19. A personal mobile terminal as in claim 16, further comprising a frequency synthesizer, coupled to said first receiver, for providing a reference signal to said first receiver.

20. A personal mobile terminal as in claim 16, further comprising a wired data interface for access by an external computer to said personal mobile terminal.

* * * * *